Dec. 17, 1957 J. C. NOBLES 2,816,410
TRACTOR MOUNTED ROTARY DISC CUTTING ASSEMBLY
Filed July 14, 1952 3 Sheets-Sheet 1

INVENTOR
JOE C. NOBLES
BY: *Edw. F. Newton*

ATTORNEY

Dec. 17, 1957  J. C. NOBLES  2,816,410
TRACTOR MOUNTED ROTARY DISC CUTTING ASSEMBLY
Filed July 14, 1952  3 Sheets-Sheet 2
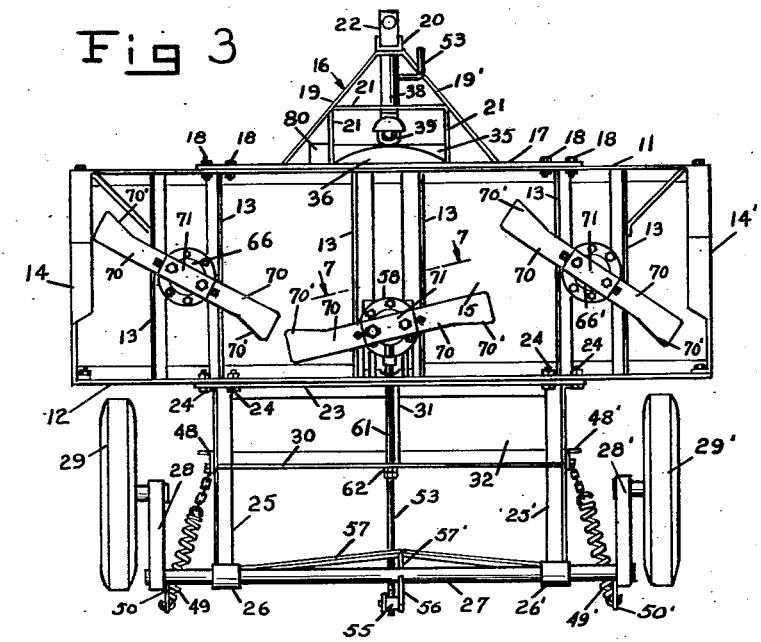
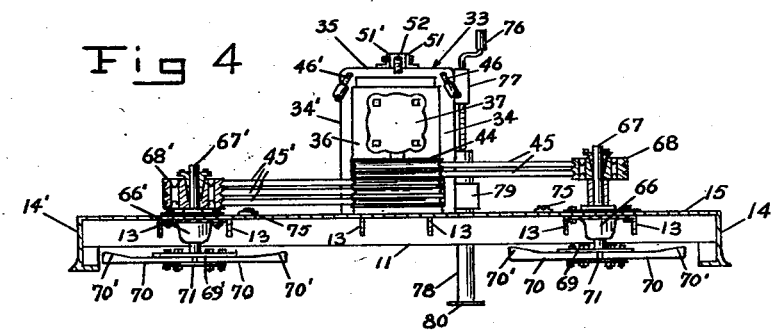
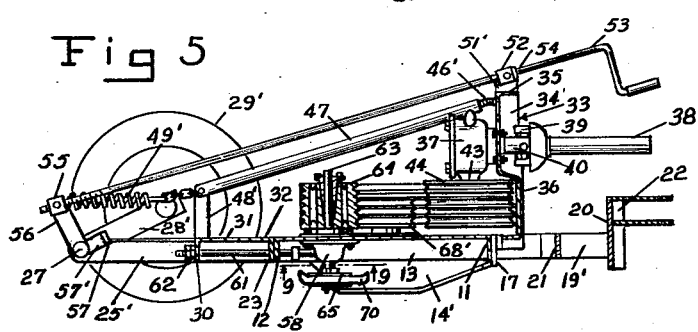
INVENTOR
JOE C. NOBLES
BY:
ATTORNEY

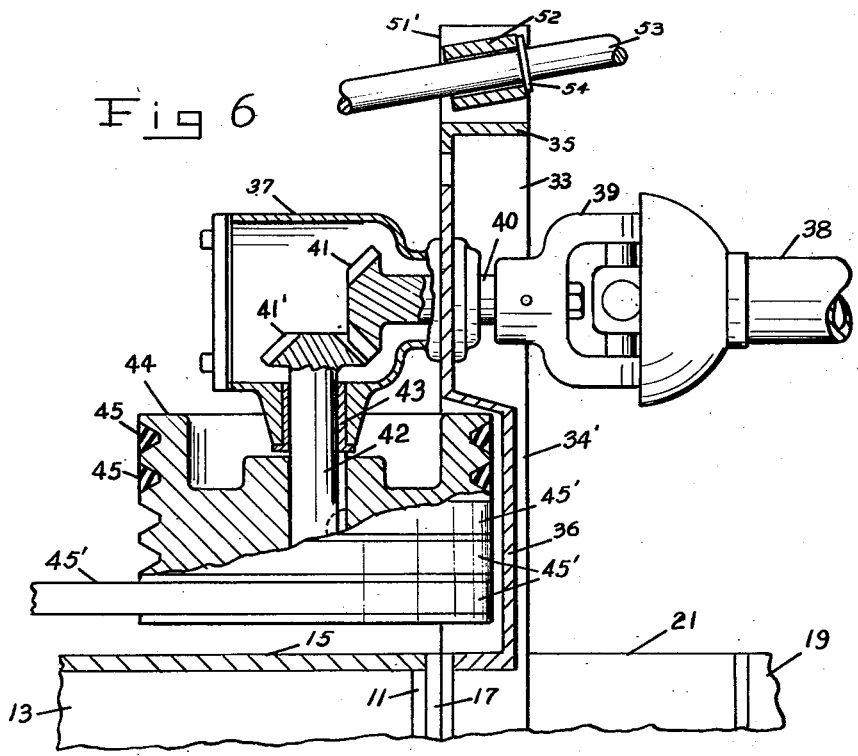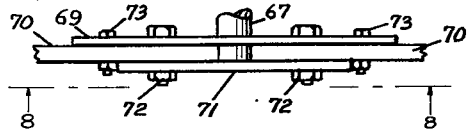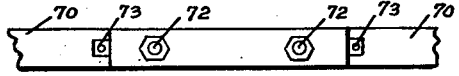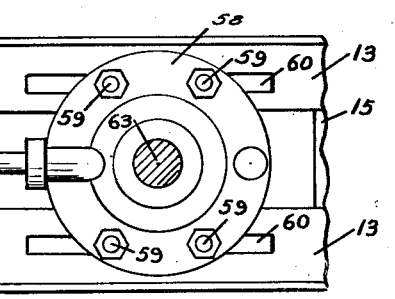
INVENTOR
JOE C. NOBLES
BY:
ATTORNEY

United States Patent Office 2,816,410
Patented Dec. 17, 1957

2,816,410
TRACTOR MOUNTED ROTARY DISC CUTTING ASSEMBLY

Joe C. Nobles, Albany, Ga., assignor to Lilliston Implement Company, Albany, Ga., a corporation of Georgia Application July 14, 1952, Serial No. 298,680

4 Claims. (Cl. 56—25.4)

This invention relates to a power mower, and more particularly to a power mower of the rotary cutter type which may be attached to a tractor for cutting and shredding stalks, scrubble, vines, grass, weeds, cover crops and the like growing in pastures, on air dromes, and elsewhere.

In conditioning farm lands, it has been found advantageous to enrich the land by cutting or shredding stalks, scrubble, vines, cover crops, etc. into a valuable mulch, leaving this mulch on the ground to help control soil erosion and provide fertilizer for the soil. This chopping and shredding of the stalks, scrubble, vines, cover crops, etc. also destroys hatching places for many harmful insects, particularly corn borers, cotton boll weevils and other pests.

If the material were not shredded or formed in a mulch, it would be difficult for plows, harrows, or colter wheels to pass over this material in tilling the soil. Therefore, in developing a machine which will cut and shred the material into fine particles that will not interfere with the tilling of the soil, of necessity, the machine must be rugged and well constructed and yet be capable of passing through dense material and over rough terrain, and must provide swift cutting action close to the ground.

My power mower is particularly adapted to cut and shred materials of varying size and toughness, and yet is capable of and especially adapted to the mowing of air dromes and other large tracts of land having grass and small fibrous material growing thereon.

Most of the prior art machines have been large cumbersome mowing devices which take up a great deal of space in a boxcar or shipping container and therefore the tremendous shipping cost must be included with the cost of the machine. My machine on the other hand is capable of being broken down into several parts which are economically nested together in such a way that substantially twice the number of mowing machines may be shipped in a given space.

It is an object of my invention, therefore, to provide a simply constructed, durable, power mower which may be easily disassembled and nested for shipment.

Another object of my invention is to provide a power mower which is supported on wheels which follow the blades in such a way that these wheels will pass over the ground after the blades have cut the growing material.

Another object of my invention is to provide a power mower having cutter blades so arranged that they will mow a uniform section of growing material and yet provide a minimum of wear on the machine.

Another object of my invention is to provide a power mower having cutter blades which are so arranged that they will not be thrown away from the machine if subjected to shearing force.

Another object of my invention is to provide a power mower having a plurality of cutter blades driven by belts which may be adjusted by a single adjustment.

Another object of my invention is to provide a power mower which may be towed and driven by a tractor and so arranged that the tractor operator may adjust the height of the cutter blades without leaving the tractor seat.

Another object of my invention is to provide a power mower provided with skids which protect the blades and yet allow these blades to cut close to the ground.

Another object of my invention is to provide a power mower which is inexpensive in construction and has few moving parts to get out of adjustment.

Other and further objects and advantages of my invention will become apparent from the following description when taken in conjunction with the accompanying drawings in which like characters of reference designate corresponding parts throughout the several views, and wherein:

Fig. 1 is a perspective view of a machine constructed in accordance with my invention and attached to a conventional tractor.

Fig. 2 is a top plan view of the machine illustrated in Fig. 1 with the cover broken away and shown in section.

Fig. 3 is a bottom plan view of the machine illustrated in Fig. 1.

Fig. 4 is a cross-sectional view taken along line 4—4 of Fig. 2.

Fig. 5 is a cross-sectional view taken along line 5—5 of Fig. 2.

Fig. 6 is an enlarged cross-sectional view taken along line 6—6 of Fig. 2, with parts broken away and shown in section.

Fig. 7 is a sectional view taken along line 7—7 of Fig. 3.

Fig. 8 is a bottom view taken along line 8—8 of Fig. 7.

Fig. 9 is a sectional view taken along line 9—9 of Fig. 5.

Referring now in detail to the embodiment chosen for purpose of illustration, the cutter supporting platform 10 consists of a frame structure having transverse front frame member 11 and transverse back frame member 12 joined by spaced longitudinal ribs 13 and provided with skids 14, 14' between the ends of frame members 11 and 12. The floor of the cutter supporting platform consists of plate 15 fixed to the top of the primary frame structure.

The blade supporting platform is adapted to be attached to the rear end of a tractor or other suitable source of motive power, by a triangular towing frame which frame includes a base bar 17 fixed to front frame member 11 by bolts 18. Fixed to base bar 17 are forwardly converging support bars 19, 19' which come together at connecting member 20 and are strengthened by reinforcing members 21. Connecting member 20 is an upstanding U-shaped channel, which retains a vertically adjustable clevis 22 which is adapted to secure the front end of the towing frame to a tractor as shown in Fig. 1.

A third frame structure or wheel connecting assembly is attached to the rear of the cutter supporting platform and consists of a transverse member 23, secured by bolts 24 to back member 12, and a pair of spaced longitudinal journal supporting arms 25, 25' extending rearwardly from transverse member 23. Aligned journals 26, 26' are respectively fixed to the ends of arms 25, 25' and retain a transverse axle or torsion bar 27 therebetween. Torsion levers 28, 28' are fixed to the ends of torsion bar 27 and extend forward, outwardly of arms 25, 25' and are provided with wheels 29, 29' at their respective ends; thus by rotation of torsion bar 27, wheels 29, 29' may be raised or lowered with respect to the cutter supporting platform. It may be seen from Figs. 2 and 3 that the wheel connecting assembly is of smaller width than the cutter supporting platform so that wheels 29, 29' will always ride behind and be protected by the cutter supporting platform. The wheel connecting assembly is reinforced by a transverse strengthening member 30 passing between arms 25, 25', and by a longitudinal reinforcing brace 31 fixed centrally between member 23 and member 30. A steel plate 32 is fixed on the top of wheel connecting assembly between member 23 and member 30 to provide an additional platform for the mowing machine.

Mounted upright centrally of towing frame 16, welded to base bar 17 and reinforcing members 21 is driving pulley supporting bracket 33, having upstanding arms 34, 34' and a transverse arm 35 connecting their upper ends. Fixed to arms 34, 34' is a driving pulley protecting casing 36 which supports transmission housing 37 as illustrated in Fig. 6. A conventional power take-off drive shaft which is adapted to extend from the tractor is characterized by numeral 38 in Figs. 5 and 6 and is provided with a universal-joint coupling 39 fixed to shaft 40 which extends through driving pulley protecting casing 36 and into transmission housing 37. In Fig. 6, beveled transmission gears 41, 41' within transmission housing 37 transfer the power from horizontal drive shaft 38 to a vertical shaft 42 journaled for rotation in bearing 43 on housing 37. Vertical shaft 42 is provided with a multigroove driving pulley 44 adjacent floor 15 which pulley drives a plurality of belts 45, 45' whose function will be described in detail later.

Extending rearwardly from arms 34, 34', respectively, are bolts 46, 46' which threadably engage reinforcing struts 47, 47', as shown in Figs. 1 and 5. The opposite ends of reinforcing struts 47, 47', are bolted to braces 48, 48' which extend respectively from journal supporting arms 25, 25'. Springs 49, 49', respectively, connect braces 48, 48' to spring retaining levers 50, 50' fixed to the ends of torsion bar 27, the springs 49, 49' acting as counterbalances opposing the rotation of torsion bar 27 which normally tends to rotate against the spring tension because of the weight of the mowing machine.

A pair of opposed brackets 51, 51' are mounted upright on transverse arm 35, and a journal 52 is pivotally mounted therebetween. A height adjusting crank 53, the crank end of which is located above the towing frame 16, passes through journal 52 and is provided with a peripheral flange 54 which rides against journal 52, as shown in Fig. 4. Crank 52 extends rearwardly and downwardly and is provided with a threaded nut 55 which is pivoted on finger 56 extending up from the center of torsion bar 27. Therefore, by rotating crank 53, torsion bar 27 may be rotated in either direction, thus raising or lowering wheels 29, 29' with respect to the mowing machine. Strap 57 and brace 57' are fixed to torsion bar 27, as illustrated in Figs. 1, 2 and 3, to reinforce this torsion bar.

Mounted behind driving pulley 44 and beneath the cutter supporting base 10 is a center cutter including a center bearing 58, adjustably attached by bolts 59 riding in slots 60 in the center longitudinal ribs 13, a section of floor 15 being cut away to allow slidable adjustment of this bearing. An adjustment shaft 61 is fixed to bearing 58 and passes through aligned apertures in members 11, 23 and 30, its protruding rear end being threaded to receive lock nuts 62 so that by tightening or loosening nuts 62, the position of bearing 58 may be adjusted. A vertical blade rotating shaft 63 passes through center bearing 58 and is provided at its upper end with center pulley 64 and at its lower end with a horizontal cutter blade retaining plate 65. Center pulley 64 is a multi-groove pulley having the grooves aligned with the grooves of pulley 44 so that belts 45, 45' may pass therearound.

Spaced from skids 14, 14' and longitudinally centered beneath cutter supporting platform 10 and forward of the center cutter are side cutters including side bearings 66, 66' which retain vertical cutter blade rotating shafts 67, 67' respectively. Shafts 67, 67' also pass through the cutter supporting platform and are respectively provided with side pulleys 68, 68' at their upper ends and horizontal cutter blade supporting plates 69, 69' at their lower ends.

As illustrated in Figs. 3, 4, 7 and 8, pairs of diametrically opposed cutter blades 70 are fixed to horizontal blade retaining plates 65, 69, 69', and a blade securing plate 71 is fixed beneath each of the blade retaining plates 65, 69, 69' to sandwich the blades 70 therebetween, being retained in place by bolts 72, as illustrated in Figs. 7 and 8. Blades 70 are substantially rectangular in shape and may have a rearwardly and upwardly extending wing tip 70' along their trailing edge to create a vacuum below each blade as it rotates. Shear bolts 73 pass through retaining plates 65, 69, 69' and blades 70, outwardly from bolts 72 to thereby fix the position of each of blades 70, by retaining them in position as shown in Figs. 5, 7 and 8.

As shown in Figs. 2 and 4, the upper two belts 45 pass around pulley 44, pulley 64 and pulley 68. The lower three of belts 45' pass around pulley 44, pulley 64 and pulley 68' so that when power is supplied to driving pulley 44, each of the other pulleys will be driven in the same direction, thus causing rotation of blades 70 below the blade supporting platform. Tightening or loosening of the belts is accomplished by adjusting nuts 62 as described above.

A heart-shaped protective cover 74 in Fig. 1 is adapted to extend over pulleys 65, 68, 68' and over belts 45, 45', a space being cut therefrom to clear pulley 44. Latches 75 attach cover 74 to floor 15.

Because my mowing machine is detachable from a tractor, a standard and foot may be provided at the forward end of my machine in order to support the machine and thereby lift the cutter blades off of the ground. I have therefore provided a height adjusting crank 76 which is rotatably retained in a sleeve 77 and extends down through that sleeve to threadably engage supporting standard 78 which is slidably retained by flange 79. Sleeve 77 and flange 79 are welded in alignment to upright arm 34, and standard 78 extends down from flange 79 and is provided with a horizontal foot 80 at its lower end.

In the use and operation of my mowing machine, clevis 22 is fixed to the draw bar of a tractor, and the power take-off drive shaft 38 is connected to the power take-off shaft of the tractor. The cutter blades are rotated by drive shaft 38 rotating pulley 44 which in turn is belted to the pulleys driving the cutter blades as described above. The distance of cutter blades 70 from the ground may be varied by operating crank 53, whereupon the position of wheels 29, 29' is varied relative to the cutter blade supporting platform. When my mowing machine is towed in the manner described, blades 70 cut uniform overlapping paths; because of the small clearance between the blades 70 and floor 15, and due to the vacuum created by the winged section of these blades, high turbulence will be created between the blades 70 and floor 15, thus causing the fibrous material over which blades 70 pass, to be drawn into the blades and shredded thereafter, since each fiber is struck many times by one or several of the rotating blades.

It will be obvious to those skilled in the art that many variations may be made in the embodiment chosen for the purpose of illustration without departing from the scope of my invention as defined in the appended claims.

I claim:

1. A machine for cutting stalks or brush, comprising a travelling support, forward and rear substanially vertical shafts mounted upon the support, said shafts being spaced and arranged in a group extending longitudinally of said support, a blade secured to the lower portion of one shaft, a driving device associated with the other shaft and adapted for connection with the power take-off device of a tractor, means mounted upon the support to shift one shaft longitudinally of the support to increase the distance between said shafts, the forward and rear pulley means mounted upon the forward and rear shafts, outer substantially vertical shafts mounted upon the support upon opposite sides of and spaced from the forward and rear shafts, blades secured to the lower portions of the outer shafts, outer pulley means mounted upon the outer shafts, a belt engaging the pulley means of the forward and rear shafts and the pulley means of one outer shaft, and a belt engaging the pulley means of the forward and rear shafts and the pulley means of the other outer shaft.

2. A machine for cutting stalks or brush, comprising a travelling support, forward and rear substantially vertical shafts mounted upon the support, said shafts being spaced and arranged in a group extending longitudinally of said support, a driving device associated with one of said shafts and adapted for connection with the power take-off device of a tractor, means mounted upon the support to shift one shaft longitudinally of the support to increase the distance between said shafts, forward and rear pulley means mounted upon the forward and rear shafts, outer substantially vertical shafts mounted upon the support upon opposite sides of and spaced from the forward and rear shafts, blades secured to the lower portions of the outer shafts, outer pulley means mounted upon the outer shafts, a belt engaging the pulley means of the forward and rear shafts and the pulley means of one outer shaft, and a belt engaging the pulley means of the forward and rear shafts and the pulley means of the other outer shaft.

3. A machine for cutting stalks or brush, comprising a travelling support, forward and rear substantially vertical shafts mounted upon the support, said shafts being spaced and arranged in a group extending longitudinally of said support, a driving device associated with one of said shafts and adapted for connection with the power take-off device of a tractor, means mounted upon the support to shift one shaft longitudinally of the support to increase the distance between said shafts, outer substantially vertical shafts mounted upon the support upon opposite sides of and spaced from the forward and rear shafts, blades secured to the lower portions of the outer shafts, drive means engaging the forward and rear shafts and one outer shaft, and drive means engaging the forward and rear shafts and the other outer shaft.

4. A machine for cutting stalks or brush, comprising a travelling support, forward and rear substantially vertical shafts mounted upon the support, said shafts being spaced and arranged in a group extending longitudinally of said support, a blade secured to the lower portion of one shaft, a driving device associated with the other shaft and adapted for connection with the power take-off device of a tractor, means mounted upon the support to shift one shaft longitudinally of the support to increase the distance between said shafts, outer substantially vertical shafts mounted upon the support upon opposite sides of and spaced from the forward and rear shafts, blades secured to the lower portions of the outer shafts, drive means engaging the forward and rear shafts and one outer shaft, and drive means engaging the forward and rear shafts and the other outer shaft.

References Cited in the file of this patent

UNITED STATES PATENTS

| | | |
|---|---|---|
| 571,904 | Lankford | Nov. 24, 1896 |
| 1,680,843 | Bechaud | Aug. 14, 1928 |
| 2,250,103 | Locke et al. | July 22, 1941 |
| 2,457,458 | Girod | Dec. 28, 1948 |
| 2,489,204 | Sprick et al. | Nov. 22, 1949 |
| 2,494,662 | Lind | Jan. 17, 1950 |
| 2,580,640 | Bartch et al. | Jan. 1, 1952 |
| 2,592,991 | Yeager et al. | Apr. 15, 1952 |
| 2,620,612 | DeEugenio | Dec. 9, 1952 |
| 2,621,457 | Rosenberg | Dec. 16, 1952 |
| 2,633,687 | Bannister | Apr. 7, 1953 |
| 2,649,678 | Sishc | Aug. 25, 1953 |
| 2,688,833 | Weiss et al. | Sept. 14, 1954 |

FOREIGN PATENTS

| | | |
|---|---|---|
| 684,178 | Great Britain | Dec. 10, 1952 |

OTHER REFERENCES

Farm Implement News, page 46, May 19, 1949.

Farm Implement and Machinery Review, Aug. 1, 1950, page 597, Hayter's Rotary Grass Cutter.